(12) United States Patent
Li et al.

(10) Patent No.: US 6,215,919 B1
(45) Date of Patent: Apr. 10, 2001

(54) MECHANICAL OPTICAL SWITCHING DEVICE

(75) Inventors: Wei-Zhong Li, San Jose; Qing Shao, Sunnyvale, both of CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/333,846

(22) Filed: Jun. 15, 1999

(51) Int. Cl.$^7$ ........................................... G02B 6/26
(52) U.S. Cl. ..................... 385/16; 385/34; 385/36; 385/22
(58) Field of Search .................. 385/16–23, 34, 385/36

(56) References Cited

U.S. PATENT DOCUMENTS

| | | | |
|---|---|---|---|
| 4,239,330 | 12/1980 | Ashkin et al. | 350/96.18 |
| 4,239,331 | 12/1980 | Aoyama | 350/96.2 |
| 4,303,303 | 12/1981 | Aoyama | 350/96.2 |
| 4,322,126 | 3/1982 | Minowa et al. | 350/96.2 |
| 4,634,239 | 1/1987 | Buhrer | 350/486 |
| 5,361,315 | 11/1994 | Lewis et al. | 385/16 |
| 5,838,847 | * 11/1998 | Pan et al. | 385/11 |
| 5,943,454 | * 8/1999 | Aksyuk et al. | 385/22 |

OTHER PUBLICATIONS

M. Papuchon et al. In "Electrically Switched Directional Coupler: Cobra", Applied Physics Letters, vol. 27, No. 5, Sep. 1, 1975, pp. 289–291.

* cited by examiner

*Primary Examiner*—Hung N. Ngo
(74) *Attorney, Agent, or Firm*—Lumen Intellectual Property Services

(57) ABSTRACT

A mechanical optical switch with a first port for holding a first optical fiber and a second port for holding a second optical fiber and a lensing element positioned in front of the first and second ports. The switch has a signal port holding a signal or input fiber which emits a light beam to be switched between the first and second fibers. The light beam propagates along a free beam path to the first lensing element and is in-coupled into the first optical fiber. The switch is equipped with a beam guiding element, such as a wedge, which can be moved in and out of the free beam path for directing the light beam to the second fiber. The wedge is designed to shift the light beam by an offset and rotate it by an angle.

22 Claims, 3 Drawing Sheets

MECHANICAL OPTICAL SWITCHING DEVICE

FIELD OF THE INVENTION

This invention relates generally to optical switches and in particular to mechanical optical switches using movable light guiding elements for altering optical beam paths to effectuate switching.

BACKGROUND OF THE INVENTION

Optical switches play a fundamental role in optical systems and in optical communications systems in particular. The function of optical switches in optical communications is to connect and disconnect transmission paths to rout light beams modulated with information. In other systems optical switches can be used to pulse a light source, e.g., a laser or to perform other functions with modulated or unmodulated light beams. Because optical signals propagate at the speed of light it is important that the optical switches have high switching rates such that they not impede the intrinsically high speed operation of optical systems.

Mechanical optical switches are known. For example, an electro-optically switched directional coupler is proposed by M. Papuchon et al. in "Electrically Switched Directional Coupler: Cobra", *Applied Physics Letters*, Vol. 27, No. 5, Sep. 1, 1975, pp. 289–291. Further modifications to this switch and similar devices are found in numerous subsequent publications. Although these types of mechanical optical switches are capable of relatively high switching rates, they suffer from many limitations. These limitations include high insertion losses, high susceptibility to temperature variations and other detrimental effects due to external factors. Prior art solutions to the high insertion loss have resulted in devices which are low speed.

In optical communications systems optical switches have to be able to switch the light path of a light beam between optical fibers. Hence, fast switching rates have to be supplemented by high switching precision and low insertion losses to achieve efficient in-coupling into the fibers. Because of these additional requirements the early mechanical optical switches are not suitable for optical communications systems.

Mechanical optical switches adapted to optical communications systems are known. For example, in U.S. Pat. No. 4,239,330 Ashkin et al. teach a multiple optical switch built of two quarter-period graded refractive index lenses sharing a common lens axis. An input fiber delivers a light beam to one of the lenses at a radial offset from common lens axis. A number of output fibers are positioned at the same radial offset and at certain angular displacements on the second lens about the common lens axis. Rotating the lenses relative to each other results in in-coupling of light from the input fiber to different output fibers. The disadvantages of this approach are high insertion loss, low switching speed, low level of reliability and difficulties in making this type of switch.

Another mechanical optical switching device for use with optical fibers is taught by Aoyama in U.S. Pat. No. 4,239,331. This switch utilizes at least one movable transparent dielectric plate positioned between an input fiber and output fibers. The output fibers have associated lenses for in-coupling the light into them. The plate, when placed in the optical path of the light changes its optical transmission path by shifting or offsetting the optical axis of the light from one output fiber to another. U.S. Pat. No. 4,322,126 to Minowa et al. presents a similar mechanical optical switching device which can take advantage of additional prism elements to alter the light path. In a similar vein, U.S. Pat. No. 4,303,303 to Aoyama discloses a variation of the mechanical optical switching device using a parallelogram prism and additional triangular prisms. Unfortunately, the use of additional optical prism elements increases the size of the switching device and introduces a number of additional reflective surfaces in the light path which lead to alignment problems and increased insertion losses.

In U.S. Pat. No. 4,634,239 Buhrer teach a multiple optical fiber electromechanical switch utilizing a rhombic prism. The prism exchanges the optical paths of two parallel beams by means of four refractions and at least two internal reflections. This exchange operation is performed by shifting the beams. The prism's rhombic geometry minimizes the size of the prism and the shift distance to the prism's activated position.

In U.S. Pat. No. 5,361,315 Lewis et al. teach a refractive element optical transmission switch with a fixed position concave reflector and an array of optical input and output waveguides. Rotation of the refractive element is used to couple light from one of the input waveguides to one of the output waveguides.

In fact, none of the prior art mechanical switches are suitable for fast and precise switching between optical fibers. The solutions relying on reflectors are very sensitive to angular variations, while the prism-based solutions are sensitive to variations in shift or offset. Thus, small misalignments, thermal effects, mechanical vibration as well as other typical perturbations make it very difficult for those devices to couple light between fibers rapidly while maintaining low insertion losses. The light emitted from the core of the input fiber or waveguide has to be redirected and in-coupled into the core of the output fiber or waveguide. In optical fibers, and especially in single-mode optical fibers, the acceptance cone and the area on which the in-coupling beam has to be focused are small. The low tolerances of in-coupling angle or offset found in the prior art devices limits their usefulness in these applications. What is desired is a device which is relatively insensitive to variations in beam shift and beam angle. Such device should be capable of fast switching rates and use few optical elements in the path between the input fiber and the output fibers.

OBJECTS AND ADVANTAGES OF THE INVENTION

Accordingly, it is a primary object of the present invention to provide a mechanical optical switch for switching a light beam between an input fiber and output fibers utilizing the fewest optical elements and achieving precise control over the shift and angle of the light beam.

It is a further object of the invention to provide a mechanical optical switch which has a low insertion loss and is capable of fast switching rates. Specifically, it is an object of the invention to provide the switch with a light guiding element which is small and light weight.

It is also an object of the invention to provide a mechanical optical switch which is significantly less sensitive to beam shifts and angular variations, thus rendering the switch useful for practical high-speed applications.

The above objects and advantages, as well as numerous improvements attained by the apparatus and method of the invention are pointed out below.

SUMMARY

These objects and advantages are secured by a mechanical optical switch with a first port for holding a first optical fiber and a second port for holding a second optical fiber. A first lensing element, e.g., a graded index (GRIN) lens, is positioned in front of the first and second ports. The switch has a signal port holding a signal or input fiber which emits a light beam to be switched between the first and second fibers. The light beam propagates along a free beam path to the first lensing element and is in-coupled into the first optical fiber. The switch is equipped with a beam guiding element which can be moved in and out of the free beam path by a suitable mechanism such as a mechanical actuator, electromechanical actuator, magnetic actuator, piezoelectric actuator or any other suitable device. The beam guiding element is designed such that it shifts the light beam by an offset and rotates the light beam by an angle. Thus, the light beam propagates along a guided beam path to the first lensing element and is in-coupled into the second optical fiber.

The beam guiding element is a wedge prism designed such that the light beam enters the wedge prism through a first facet and exits the wedge through a second facet without undergoing any internal reflections. Furthermore, the first facet is oriented at a first angle α to a line normal to an optical axis of the first lensing element. The second facet is inclined at an angle β with respect to the first facet. The free beam path is inclined at an angle δ with respect to the optical axis of the first lensing element and the wedge is preferably designed such that:

$$\sin^{-1}\{n \sin[\sin^{-1}[1/n \sin(\alpha-\delta)]+\beta]\}=\alpha+\beta+\delta,$$

where n is the refractive index of the wedge prism.

In one embodiment the signal port is inclined with respect to the optical axis of the first GRIN lens. This inclination aids in achieving precise control of the in-coupling angle of the light beam.

Preferably, a second lensing element, e.g., a second GRIN lens is positioned in front of the signal port for collimating the light beam. The use of GRIN lenses is especially important for precise control of in-coupling when the first and second fibers are single-mode optical fibers. Of course, the input fiber can also be a single-mode fiber.

The particulars of the invention and its various embodiments are described in detail in the detailed description section with reference to the attached drawing figures.

DETAILED DESCRIPTION

Figure 1:
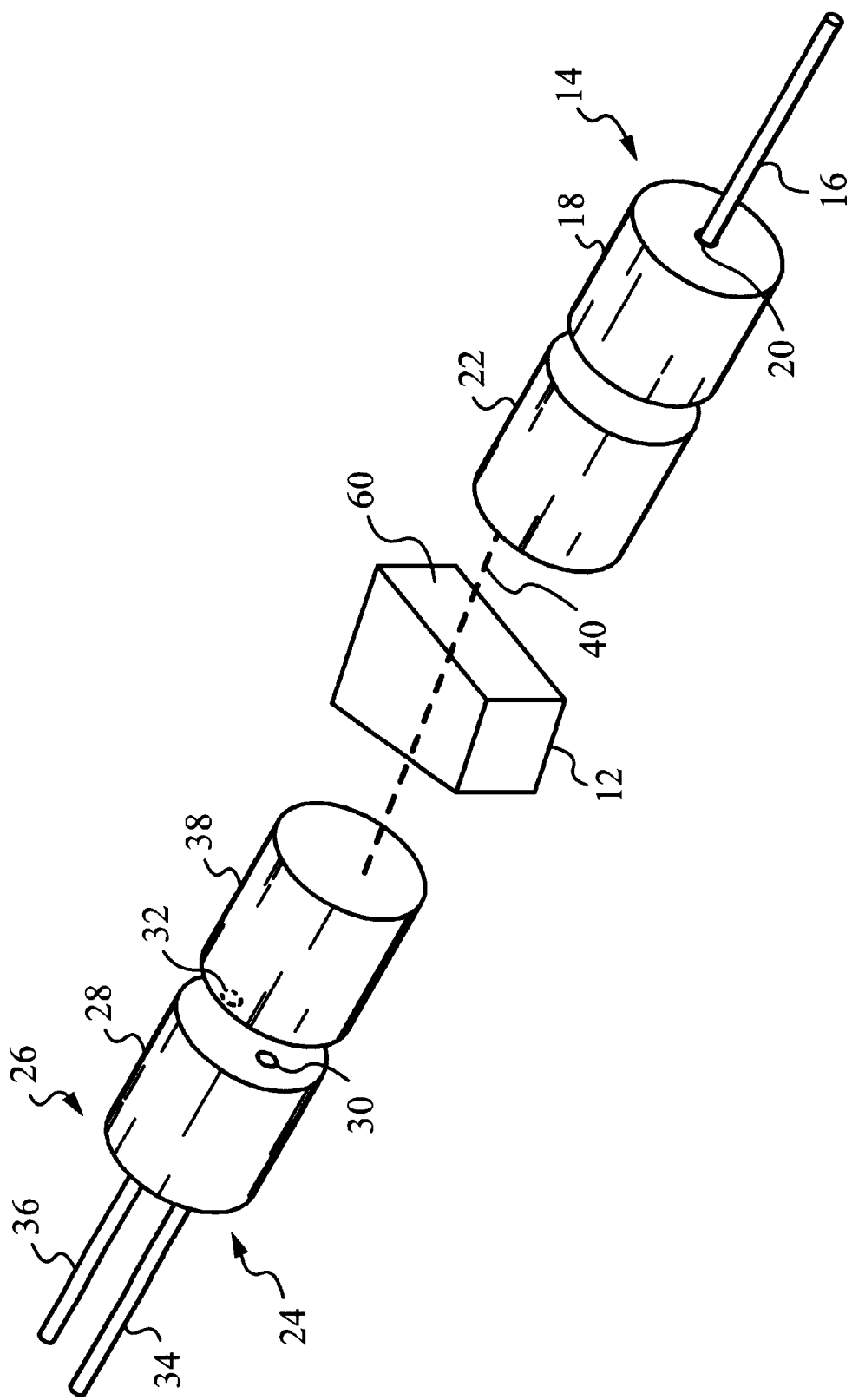
FIG. 1 is an isometric view of the essential optical components of a mechanical optical switch according to the invention.

FIG. 1 shows the preferred arrangement of essential optical components of a mechanical optical switch equipped with a beam guiding element 12 in the form of a wedge prism. Wedge 12 is made of a material having a uniform refractive index n. For example, quartz or glass is used for wedge 12.

On one side of wedge 12 is an input port 14 holding a signal or input fiber 16. Preferably, input port 14 consists of a glass capillary 18 having a bore or hole 20 for inserting input fiber 16. A lensing element 22, in this case a graded index (GRIN) lens, is positioned in front of capillary 18.

On the other side of wedge 12 is a first output port 24 and a second output port 26. Preferably, a glass capillary 28 with two bores 30, 32 serves the function of output ports 24, 26. A first optical fiber 34 is inserted into bore 30 and a second optical fiber 36 is inserted into bore 32. In fact, fibers 34 and 36 are the output fibers of the optical switch.

A lensing element 38 is positioned in front of capillary 28 for focussing light into the cores of output fibers 34, 36. In this case, lensing element 38 is a GRIN lens. The use of only one lensing element 38 for both output fibers 34, 36 is preferred because it reduces the size and weight of the optical switch and presents optical advantages as discussed below.

A free beam path 40 is defined between the input fiber and first fiber 34. Free beam path 40 is the path along which light will propagate between input fiber 16 and output fiber 34 when wedge 12 is absent.

Figure 2:
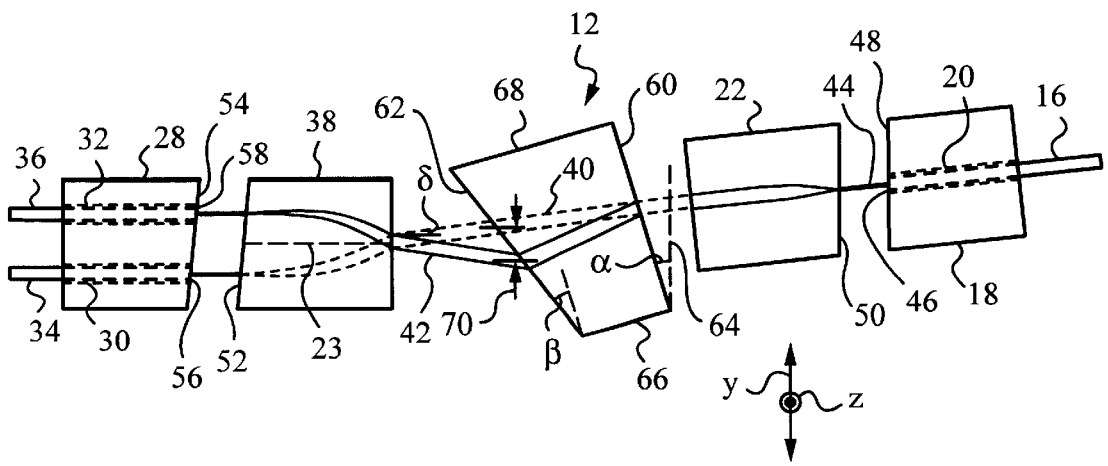
FIG. 2 is a top plan view of the optical parts of the switch of FIG. 1 detailing the free and guided beam paths.

Wedge 12 can be moved in such a way that in one position, it is not in free beam path 40 and in a second position, a switched or active position, it is in free beam path 40. This will be better understood by referring to the plan view of FIG. 2, which indicates free beam path 40 and a guided beam path 42 when wedge 12 is in the active position.

Specifically, when wedge 12 is removed a light beam 44 issuing from input fiber 16 is out-coupled from fiber end 46 and collimated by GRIN lens 22 to propagate along free beam path 40 indicated in dashed lines. Free beam path 40 is inclined at an angle δ with respect to an optical axis 23 of GRIN lens 38. Thus, GRIN lens 38 receives light beam 44 at angle of incidence equal to angle δ and focuses it into the core of first fiber 34. In this manner, light beam 44 is in-coupled into first fiber 34.

In order to prevent back-reflection of beam 44 an output face 48 of glass capillary and fiber end 46 are machined at a slant, e.g., between 6 to 10°. An input face 50 of lens 22 exhibits a reverse slant at the same angle. In a similar manner, a back face 52 of GRIN lens 38 and a front face 54 of capillary 28 as well as fiber ends 56 and 58 of fibers 34 and 36 are also machined at reverse slants. This method of preventing back reflection is well-known in the art.

When wedge 12 is placed in free beam path 40, light beam 44 propagating along free beam path 40 enters wedge 12 through a first facet 60 and exits through a second facet 62. In other words, with wedge 12 in the active position light beam 44 propagates along free beam path 40 only up to wedge 12 and then propagates along guided light path 42. In doing so, light beam 44 undergoes refraction in accordance with Snell's law at both facets 60 and 62.

First facet 60 of wedge 12 is oriented at an angle α with respect to a normal 64 to optical axis 23 of GRIN lens 38. Second facet 62 is inclined at an angle β with respect to first facet 60. Remaining two facets 66, 68 of wedge 12 are not used and can thus be parallel, as shown.

Light beam 44 is refracted in wedge 12 and undergoes a shift by an offset 70 and rotation by an angle such that GRIN 38 in-couples light beam 44 into second fiber 36. In this case the angular rotation is equal to 2δ and light beam 44 is incident on GRIN 38 at angle −δ. It will be noted that it is the amount by which second facet 62 is inclined to first facet 60, i.e., angle β and the amount of offset 70 are the two parameters controlling this refraction process.

Wedge 12 is not very sensitive to variations in angle α, which cause only small changes in the angular rotation. In other words, changes in angle a cause only small changes in angle δ.

The amount of offset 70 is controlled by adjusting the position of wedge 12 along axis y. Shortening the path of beam 44 in wedge 12 by moving wedge 12 in the positive y direction decreases offset 70. Lengthening the path of beam 44 in wedge 12 by moving it in the negative y direction increases offset 70. The advantage of controlling offset 70 in this manner is that it allows for large alignment tolerances. In fact, offset 70 can be controlled even after assembly of the switch by adjusting the y-position of wedge 12. This makes optical switches using wedge 12 easier to assemble, stable and more reliable.

In the preferred embodiment wedge 12 is designed to preserve the following relationship between angles α, β and δ:

$$\sin^{-1}\{n \sin[\sin^{-1}[1/n \sin(\alpha-\delta)]+\beta]\}=\alpha+\beta+\delta,$$

where n is the refractive index of wedge 12. It is also preferred to keep angle δ small, e.g., on the order of 5° or less. Thus, a change in angle α will typically alter angle δ by about 5% or less. Under these circumstances optical alignment is not very sensitive to the position accuracy of wedge 12. Therefore, mechanical, thermal or other perturbations affecting the position of wedge 12 will not significantly affect its ability to guide and in-couple light beam 44 from input fiber 16 to second fiber 36. This insensitivity to mechanical perturbations further increases the stability and reliability of optical switches using wedge 12.

To achieve high-precision in-coupling of light beam 44 into fibers 34 and 36 input port 14 is tilted or inclined with respect to optical axis 23. The amount of inclination is regulated on a case-by-case basis until optimal in-coupling efficiencies are obtained for light beam 44 propagating along free beam path 40 and guided beam path 42. This adjustment is particularly important when fibers 34 and 36 are single-mode, or when all fibers, including fiber 16 are single-mode.

Figure 3A:
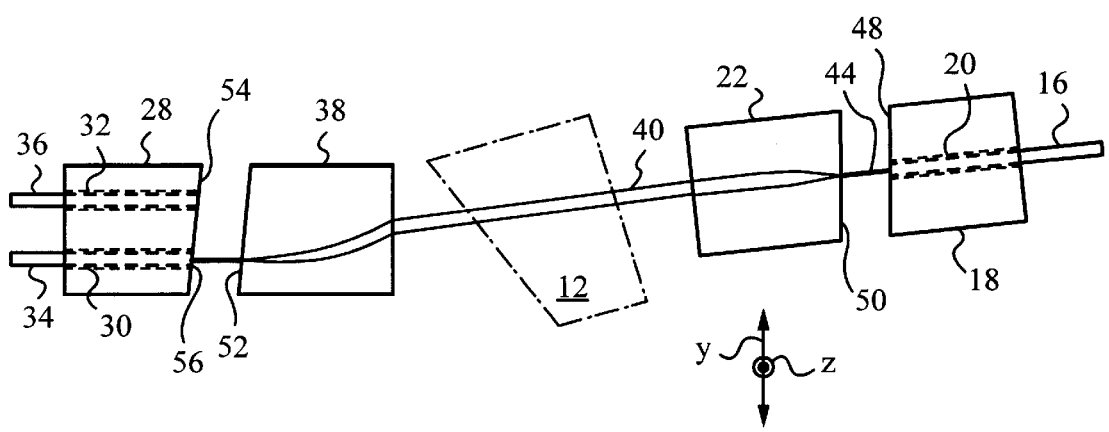
FIGS. 3A–B are a top plan view illustrating the operation of the switch of FIG. 1.
Figure 3B:
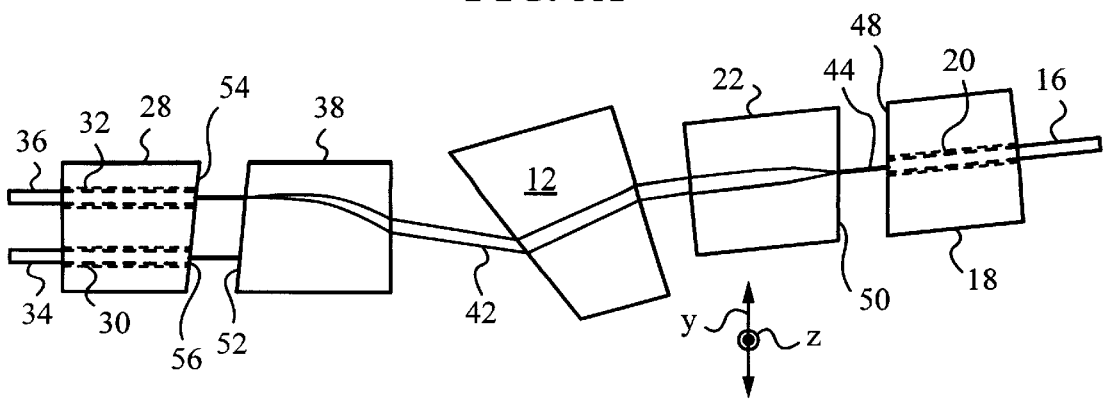

FIGS. 3A–B illustrate the operation of the optical elements of the switch. FIG. 3A shows wedge 12 in the inactive position where wedge 12 is moved out of the plane of the paper along the z-axis. This is indicated by the fact that wedge 12 is drawn in dashed and dotted lines. Light beam 44 from fiber 16 propagates along free beam path 40 and is in-coupled into fiber 34. FIG. 3B shows wedge 12 in the active position. Light beam 44 from fiber 16 propagates along guided beam path 42 and is in-coupled into fiber 36.

It should be noted that wedge 12 can be removed from free beam path 40 along any direction. In other words, wedge 12 could be displaced laterally along the y-axis until it is no longer in free beam path 40. At the same time, small lateral adjustments of the position of wedge 12 along the y-axis are effectuated for controlling offset 70, as discussed above.

Figure 4:
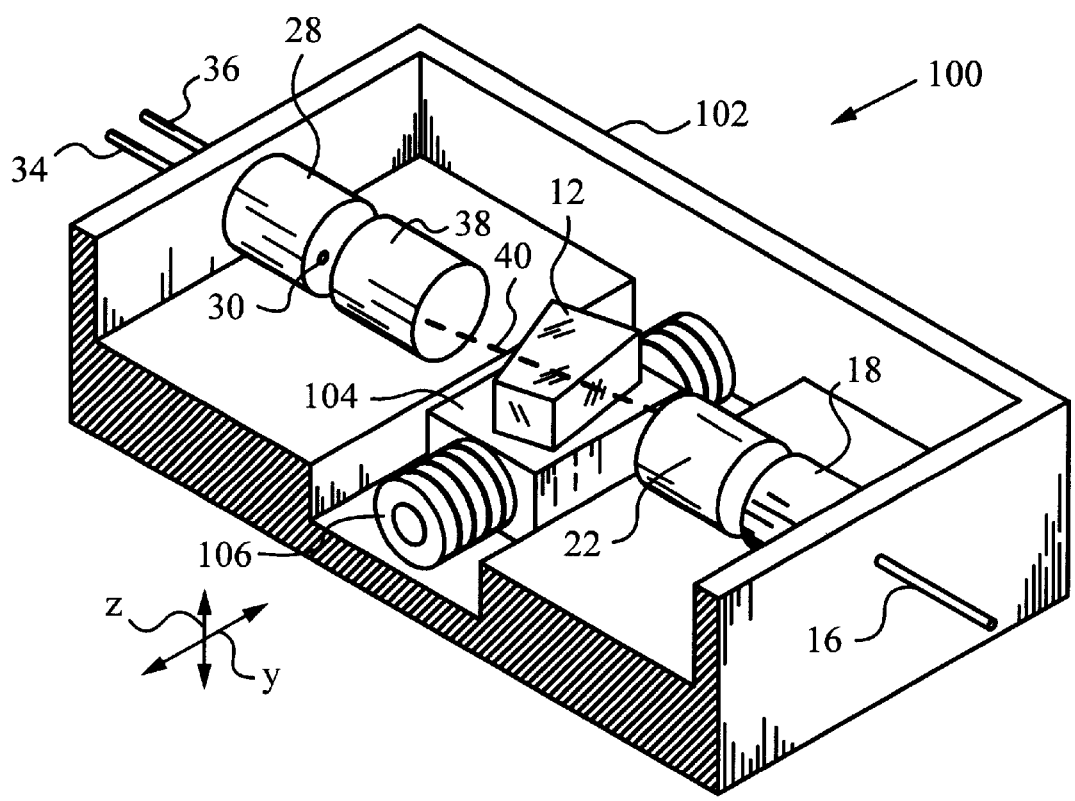
FIG. 4 is an isometric view of a preferred mechanical optical switch implementing a wedge prism in accordance with the invention.

FIG. 4 shows a mechanical optical switch 100 in accordance with the invention. Switch 100 utilizes the optical elements described above and the same reference numerals are used to refer to the same parts.

Switch 100 has a housing 102 for mounting the optical elements. Wedge 12 is positioned on a mechanical stage 104. An actuator mechanism 106, in this case a solenoid, is used to displace stage 104 in the lateral direction along the y-axis for tuning of offset 70. Stage 104 also has an internal mechanism for moving wedge 12 along the z-axis. In particular, stage 104 includes a z-adjustment to allow it to move wedge 12 down and out of free beam path 40.

Stage 104 is capable of rapidly moving wedge 12 in and out of free beam path 40 to switch optical beam 44 between fibers 34 and 36. As will be appreciated by a person skilled in the art, actuator mechanism 106 as well as the mechanism for z-axis control of stage 104 can be any suitable mechanical actuator, electromechanical actuator, magnetic actuator, piezoelectric actuator. For example, actuator 106 and the z-adjustment can be a relay, a solenoid or a drive motor.

Switch 100 is very efficient and robust. Wedge 12 designed in accordance with the invention is typically smaller than the prisms used in prior art systems. In fact, wedge 12 may weigh one fourth of a typical prism in a prior art optical switch. Furthermore, the use of one GRIN 38 for both fibers 34, 36 allows the designer to keep switch 100 small and take full advantage of small-sized wedge 12. The low weight and relative insensitivity to misalignments of wedge 12, permitting it to operate reliably at high switching rates, as well the small overall size of switch 100 are among the main advantages of the invention.

It will be clear to one skilled in the art that the above embodiment may be altered in many ways without departing from the scope of the invention. Accordingly, the scope of the invention should be determined by the following claims and their legal equivalents.

What is claimed is:

1. A mechanical optical switch comprising:
    a) a first port for holding a first optical fiber;
    b) a second port for holding a second optical fiber;
    c) a first lensing element having an optical axis and being positioned in front of said first port and said second port;
    d) a signal port for holding an input fiber emitting a light beam propagating along a free beam path to said lensing element such that said light beam is in-coupled into said first optical fiber;
    e) a beam guiding element positioned in said free beam path for shifting said light beam by an offset and rotating said light beam by an angle such that said light beam propagates along a guided beam path to said first lensing element and is in-coupled into said second optical fiber;
    f) a means for moving said beam guiding element in and out of said free beam path.

2. The mechanical optical switch of claim 1, wherein said beam guiding element is a wedge prism and said light beam enters said wedge prism through a first facet and exits said wedge prism through a second facet.

3. The mechanical optical switch of claim 2, wherein said first facet is oriented at a first angle α to a line normal to said optical axis, and said second facet is inclined at an angle β with respect to said first facet.

4. The mechanical optical switch of claim 3, wherein said free beam path is inclined at an angle δ with respect to said optical axis.

5. The mechanical optical switch of claim 1, wherein said signal port is inclined with respect to said optical axis.

6. The mechanical optical switch of claim 1, wherein said first lensing element is a graded index lens.

7. The mechanical optical switch of claim 1, further comprising a second lensing element positioned in front of said signal port for collimating said light beam.

8. The mechanical optical switch of claim 7, wherein said second lensing element is a graded index lens.

9. The mechanical optical switch of claim 1, wherein said first optical fiber and said second optical fiber are single-mode optical fibers.

10. The mechanical optical switch of claim 1, wherein said input fiber is a single mode optical fiber.

11. The mechanical optical switch of claim 1, wherein said means for moving said beam guiding element is selected from a group of devices consisting of mechanical actuators, electromechanical actuators, magnetic actuators and piezoelectric actuators.

12. A mechanical optical switch comprising:
   a) a first port for holding a first optical fiber;
   b) a second port for holding a second optical fiber;
   c) a first lensing element having an optical axis and being positioned in front of said first port and said second port;
   d) a signal port for holding an input fiber emitting a light beam propagating along a free beam path to said lensing element such that said light beam is in-coupled into said first optical fiber;
   e) a wedge prism having a predetermined refractive index n and being positioned in said free beam path for shifting said light beam by an offset and rotating said light beam by an angle such that said light beam propagates along a guided beam path to said first lensing element and is in-coupled into said second optical fiber;
   f) a means for moving said beam guiding element in and out of said free beam path.

13. The mechanical optical switch of claim 12, wherein said wedge prism comprises:
   a) a first facet inclined at a first angle $\alpha$ to a line normal to said optical axis;
   b) a second facet inclined at an angle $\beta$ with respect to said first facet;

and said light beam enters said wedge prism through said first facet and exits said wedge prism through said second facet.

14. The mechanical optical switch of claim 13, wherein said free beam path is inclined at an angle $\delta$ with respect to said optical axis.

15. The mechanical optical switch of claim 14, wherein said wedge prism is designed such that:

$$\sin^{-1}\{n \sin [\sin^{-1}[1/n \sin(\alpha-\delta)]+\beta]\}=\alpha+\beta+\delta.$$

16. The mechanical optical switch of claim 12, wherein said signal port is inclined with respect to said optical axis.

17. The mechanical optical switch of claim 12, wherein said first lensing element is a graded index lens.

18. The mechanical optical switch of claim 12, further comprising a second lensing element positioned in front of said signal port for collimating said light beam.

19. The mechanical optical switch of claim 18, wherein said second lensing element is a graded index lens.

20. The mechanical optical switch of claim 12, wherein said first optical fiber and said second optical fiber are single-mode optical fibers.

21. The mechanical optical switch of claim 12, wherein said input fiber is a single mode optical fiber.

22. The mechanical optical switch of claim 12, wherein said means for moving said beam guiding element is selected from a group of devices consisting of mechanical actuators, electromechanical actuators, magnetic actuators and piezoelectric actuators.

* * * * *